I. M. JACOBS.
MEANS FOR SUSPENSION OF ENGINES IN MOTOR VEHICLES.
APPLICATION FILED APR. 21, 1917.

1,398,024.

Patented Nov. 22, 1921.
2 SHEETS—SHEET 1.

INVENTOR:
Isidor M. Jacobs,
BY
Hugh K. Wagner,
ATTORNEY.

I. M. JACOBS.
MEANS FOR SUSPENSION OF ENGINES IN MOTOR VEHICLES.
APPLICATION FILED APR. 21, 1917.
1,398,024.
Patented Nov. 22, 1921.
2 SHEETS—SHEET 2.
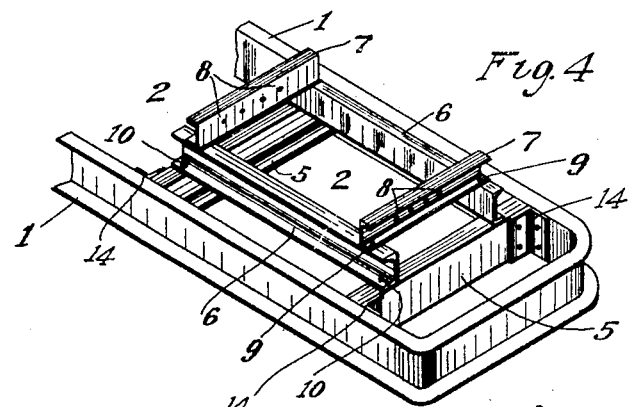
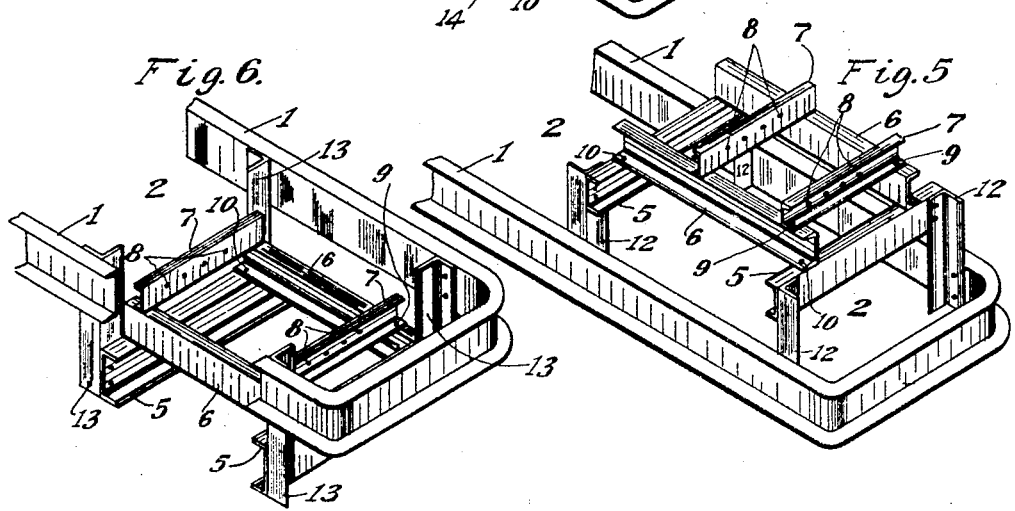
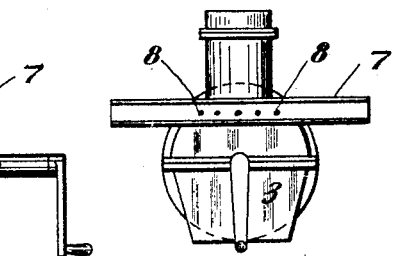
INVENTOR:
Isidor M. Jacobs,
BY
Hugh K. Wagner
ATTORNEY.

UNITED STATES PATENT OFFICE.

ISIDOR MORRISON JACOBS, OF KANSAS CITY, MISSOURI, ASSIGNOR, BY MESNE ASSIGNMENTS, TO TRUCK, TRACTOR AND MANUFACTURING COMPANY, OF ST. LOUIS, MISSOURI, A CORPORATION OF MISSOURI.

MEANS FOR SUSPENSION OF ENGINES IN MOTOR-VEHICLES.

1,398,024.   Specification of Letters Patent.   Patented Nov. 22, 1921.

Application filed April 21, 1917. Serial No. 163,652.

*To all whom it may concern:*

Be it known that I, ISIDOR M. JACOBS, a citizen of the United States, residing at Kansas City, in the county of Jackson and State of Missouri, have invented certain new and useful Improvements in Means for Suspension of Engines in Motor-Vehicles, of which the following is a specification.

This invention has for its object the provision of means whereby any kind of an engine can be suspended in a standard truck or tractor frame. More specifically stated, it is intended to afford opportunities for using the large and increasing number of second-hand engines of used pleasure motor-cars or the like in the construction of low-priced trucks and tractors and tractor-trucks. In essence, it is not necessary that the engines used shall be second-hand or that they shall have come from pleasure cars or be of that type; but the problem solved and the commercial and industrial end attained by this invention is that it affords an outlet or use for an immense number of second-hand internal combustion engines that are now for sale but without customers and for the additional engines of that kind that year after year will be introduced into the already glutted market. To a certain extent, this invention may be used in conjunction with the frames of cars or trucks already standard in certain sizes on the market, but this invention contemplates as a general practice the use of this inventor's standard truck or tractor frame specifically constructed and provided for the utilization of this invention, which standard frame will be of uniform dimensions and sizes suitable for trucks or the like, such frame having in each instance a width or clearance between its sides greater than the width of the pleasure car or the like from which its engine is derived.

In further explanation of the foregoing and of the purposes of this invention, it will be noted that the number of second-hand pleasure automobiles is constantly growing, because each time an automobile owner purchases a new car the dealer from whom he buys it must dispose of his old one. In the majority of instances, it is found that persons making their first purchase of an automobile prefer to buy a new car. This makes it increasingly more difficult to dispose of the second-hand ones, with the result that many of them are sold for a bagatelle simply to be dismantled for their parts, the most valuable of which are the engine and transmission (constituting a unitary power plant), the engine being generally in a very serviceable condition. The commercial and farm use of trucks and tractors is rapidly growing, and can be made even more widespread with the resultant advantages to the community at large as well as to individuals if the first cost of trucks and tractors can be reduced. This is made possible by the present invention.

At the present time there is available a large number of discarded internal combustion engines for which there is no use because their number exceeds present possible uses, but all of which can be put to valuable use by means of the present invention. Thus, the above-mentioned large number of good engines (which are now practically waste material) are rescued for important service, while agricultural development is promoted by the introduction of the cheap tractors and cheap trucks made possible by this invention, and the use of trucks and tractors and tractor-trucks for all uses is promoted.

The means provided by this invention for accomplishing the above-stated desirable results consists of a suspension means adaptable to any engine of any size or shape or variety of suspension in combination with a truck or tractor frame or chassis made of a standard size or standard sizes wider than the frame or chassis of the vehicle from which the engine was derived. In some cases a truck already on the market will be found to have a frame wide enough for the purposes of this invention, in which case only the suspension means of this invention and a suitable engine will be used, but in combination therewith. In other instances the inventor's standard truck-frame will be necessary, in combination with the suspension means of this invention, in order to provide a frame wider than the frame of the vehicle from which the engine was derived.

The suspension means of this invention will preferably consist of a unitary structure or bed-plate adapted in each individual case to suspend or hold the engine within or above the chassis and, furthermore, adapted to be fastened to the said chassis in any suitable manner. It is well known that engines of different types or manufactures differ in details so as to require different means for suspension or modes of connection to supporting means, and there are further differences from year to year in the engines of any one manufacturer. For this reason, in actual use of this invention, a dealer in pleasure motor-cars who has taken in trade a used pleasure car or the like for which he has no ready sale can telegraph or write for the suspension means of this invention or for the same and this inventor's standard chassis, mentioning the year and kind of engine that he intends to use in making a truck or tractor, and thereupon he can be supplied with this invention exactly adapted, down to the details of bolts and bolt holes, to the use of the particular engine that he has on hand.

In the accompanying drawings forming part of this specification and in which like numbers of reference denote like parts wherever they occur, Figure 1 is a perspective view showing one form of this invention, in which the suspending means is depressed to afford a lower suspension for the engine, the degree of depression being optional;

Figs. 4 and 5 illustrate additional modifications;

Fig. 6 shows an adaptation of this invention for suspending an engine lower than the chassis-frame;

Fig. 7 is a side elevation of an engine showing means borne thereby for attaching the same to the support of this invention; and Fig. 8 is an end view of the engine and parts illustrated in Fig. 7.

Figure 1:
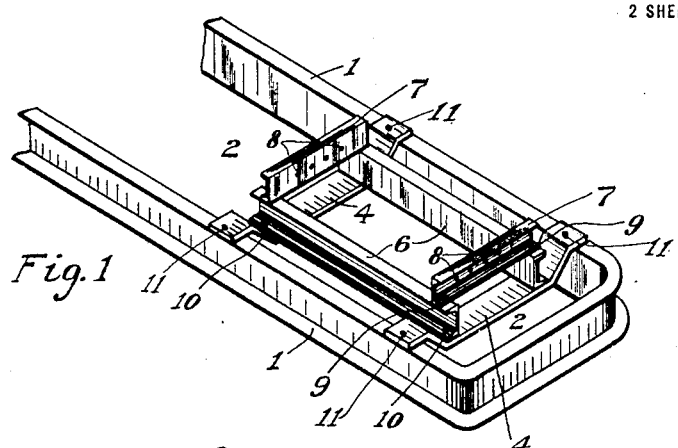
Figure 2:
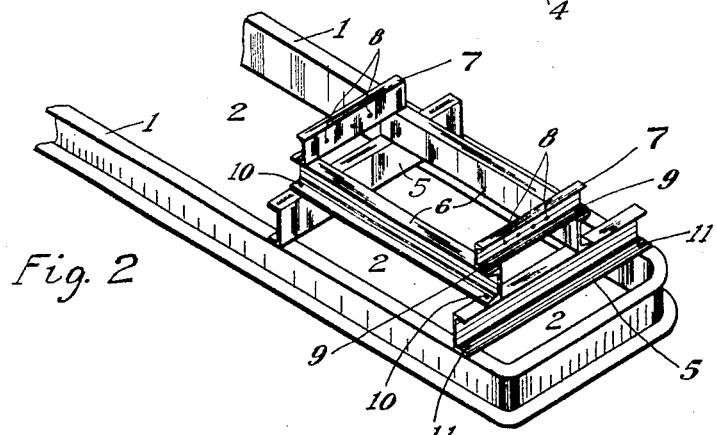
Fig. 2 depicts another form of this invention, in which a relatively high support will be afforded the engine.
Figure 3:
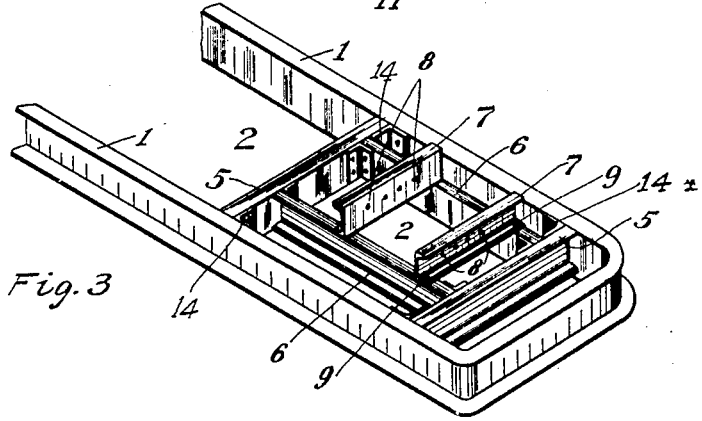
Fig. 3 illustrates another form of this invention, in which the supporting means is in the same horizontal plane as the chassis-frame.

The chassis-frame 1 may be either that of an ordinary truck or tractor or the like or it may be the hereinabove-mentioned standard-size chassis of the inventor, but in either event will be wider than the engine, so as to permit of the same being suspended in the space 2 between the side members of the said frame. In the drawings the said frame is shown formed of channel-iron. The engine 3 may be suspended low, as shown in Fig. 6, or high, as shown in Figs. 2 and 5, or in intermediate position, as shown in Figs. 1, 3, and 4.

The support or bed-plate for the engine 3 is a unitary structure composed fundamentally of solid, substantial, and rigid cross-supports 4 (in Fig. 1) or other similar supports 5, as shown in the other figures of the drawings, joined together by rigid longitudinal members 6. Except in Fig. 1, both cross-pieces and longitudinal members are shown as formed of channel-iron, but I-beams or angle-irons or other substantial forms forming a solid support for the engine may be used.

The attaching members 7 are bolted at 8 to the engine 3 and likewise to the longitudinal members 6 at 9, which in turn are bolted to the cross-pieces 5 and 10. The bolting of longitudinal members 6 to cross-pieces 5 forms the unitary engine support, which is bolted at 11 to the chassis-frame 1.

It is obvious that the longitudinal and transverse bars are capable of adjustment to accommodate engines of different types and sizes, and it is apparent that it is necessary, in order to provide a support for a larger engine, only that the longitudinal bars 6 and the transverse members 5 and 7 be spaced a suitable distance from each other.

However constructed, the engine support will extend from one side of the frame to the other and will permit of the engine depending between its members, whether laterally or longitudinally or a combination of both.

In Fig. 5, angle-irons 12 are uprights to elevate the support or bed-plate above the frame 1, while in Fig. 6 the angle-irons 13 serve as hangers to hold the said support or bed-plate in a position lower than the frame 1. Angle-plates 14 strengthen the joints between various parts at sundry points in the structure.

It will be observed that in every form of bed-plate shown provision is made for the suspension of the engine in the space in the center of the bed-plate and, furthermore, that this bed-plate is adaptable to either rigid or pivotal suspension of the engine.

Which of the forms of bed-plate herein shown and described or of the numerous others that can be perceived to be in substance the same that will be selected for a particular truck or the like depends upon the form, size, and other characteristics of the particular engine that is to be used.

If some certain engine be wider than the chassis-frame, it will nevertheless be suspended therefrom by some suitable adaptation or modification of the bed-plate described herein.

In case of need diagonal or curved cross-pieces or hangers of other shapes or direction may be substituted for the transverse members of the bed-plate shown herein.

Having thus described this invention, I hereby reserve the benefit of all changes in form, arrangement, order, or use of parts, as it is evident that many minor changes may be made therein without departing from the spirit of this invention.

I claim:

A universal engine support whereby engines of different types and sizes can be supported on standard trucks or engine frames, comprising vertical supports engaging the frame bars of a chassis, transverse members on said supports, longitudinal bars supported on said transverse members, and transverse engine-engaging members supported on said longitudinal bars, said longitudinal and transverse members being capable of adjustment to accommodate engines of different types and sizes.

In testimony whereof I hereunto affix my signature.

ISIDOR MORRISON JACOBS.